(12) United States Patent
Ghosn

(10) Patent No.: US 8,351,446 B2
(45) Date of Patent: Jan. 8, 2013

(54) DEVICE, METHOD AND SYSTEM FOR WIRELESS COMMUNICATION AND USES THEREOF

(76) Inventor: Michel Ghosn, Sugar Land, TX (US)

( * ) Notice: Subject to any disclaimer, the term of this patent is extended or adjusted under 35 U.S.C. 154(b) by 389 days.

(21) Appl. No.: 12/660,009

(22) Filed: Feb. 18, 2010

(65) Prior Publication Data

US 2010/0208644 A1 Aug. 19, 2010

Related U.S. Application Data

(60) Provisional application No. 61/220,235, filed on Jun. 25, 2009, provisional application No. 61/153,887, filed on Feb. 19, 2009.

(51) Int. Cl.
*H04L 12/26* (2006.01)

(52) U.S. Cl. ........................................................ 370/413

(58) Field of Classification Search .................. 370/310, 370/315, 328, 338, 351, 389, 229, 235, 236, 370/392–394, 412–413, 419–420, 428–429
See application file for complete search history.

(56) References Cited

U.S. PATENT DOCUMENTS

| | | | |
|---|---|---|---|
| 6,587,835 B1 * | 7/2003 | Treyz et al. | 705/14.64 |
| 2006/0025158 A1 * | 2/2006 | Leblanc et al. | 455/456.2 |
| 2006/0133818 A1 * | 6/2006 | Shimizu et al. | 398/161 |
| 2008/0045141 A1 * | 2/2008 | Suga | 455/7 |
| 2008/0097822 A1 * | 4/2008 | Schigel et al. | 705/10 |
| 2008/0209494 A1 * | 8/2008 | Dravida et al. | 725/129 |
| 2008/0242314 A1 * | 10/2008 | McFarland | 455/456.1 |
| 2009/0097425 A1 * | 4/2009 | Sammour et al. | 370/310 |
| 2011/0095081 A1 * | 4/2011 | Zsigmond et al. | 235/375 |

* cited by examiner

*Primary Examiner* — Omar Ghowrwal
(74) *Attorney, Agent, or Firm* — Benjamin Aaron Adler

(57) ABSTRACT

Provided herein are an electronic device, method and system for wireless communication over a wireless network. The device comprises an addressable point in network (Pin) which listens for all available wireless signals and creates and relays wireless signals containing destination address(es) for message(s) to other Pin(s). Wireless signal(s) are relayed from the Pin device(s) to other Pins over the network. Destination, receiving and originator Pin addresses and message flags within received messages are compared with message flags in a device memory trace queue to determine if the receiving Pin is the destination and/or origin of the message and whether the received message is retained and/or relayed or dropped. The system includes the Pin(s), a wireless communication network over which the message(s) are relayed to and from the Pin(s) and an enterprise provider information system (PIS) with an application stack configured to wirelessly transmit product and services information to the Pin(s).

27 Claims, 16 Drawing Sheets

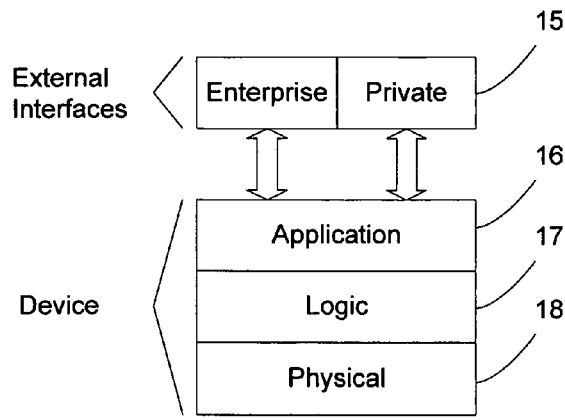

Figure 3

| ID | Web Features | Description |
|---|---|---|
| W1 | Device's activation and registration* – Optional | The user creates a User account, an ID, and a password for registering the unit. |
| W2 | Device's Configuration* | The user will be able to set in whole or partially the Personal Profile information along with other messages and variables in the device to be exchanged with other user. |
| W3 | Download* – Optional | Through their accounts, users can download games, tunes, system updates and added functionalities. |
| W4 | Report lost device - Optional | Report lost devices. This will prevent the activation of a reported stolen or lost device. |

Figure 4

| ID | Web Features | Description |
|---|---|---|
| W1...4 | Same as Private | Same as Private feature |
| W5 | Account Management | Users activate their product license, manage features, and order equipments |

Figure 5

| ID | Features | Description |
|---|---|---|
| P1 | Voice and data message recording | The enterprise receives a sample of voice recording and has the capabilities of recording their own. The data messages will be entered for different categories, group, and type of users. |
| P2 | Text to voice | Add the capability to use text instead of actual voice recorded messages |
| P3 | Interactive communication | Setup the sequence/logic of communication operation with Pin customers. |
| P4 | Database management | Customer accounts are recorded in the database and available for queries and updates |
| ID | Device Features | Description |
| D1 | External Power Source | Use the internal batteries or use an external power source connected via the USB port |
| D2 | Create Message | Record or type a message |
| D3 | Send Message | Attach address to a message and transmit it |
| D4 | Reply to Message | Create and send a message to an address identified in a received message |

Figure 6A

| ID | Features | Description |
|---|---|---|
| D5 | Voice Note | Create a message that could be attached to the timer function or be kept as a reminder |
| D6 | Exchange Addresses | Exchange address with other devices |
| D7 | PC/Web Communication | Using a PC client software package or webpage applet, the user utilizing the keyboard is able to operate the device in the same fashion as the push buttons. In addition the user can download optional received message announcement. The device originator address could be extracted and sent as an attachment in an email message to friends to put them in their devices in similar fashion as the address connector on the device. The application communicates with the device and enables customization of the display faceplate. Such customization could be identifying specific look of the display when messages arrive or sent, games and other system attributes. |
| D8 | Who's my neighbor | Contact all devices in the originator field |
| D9 | Coverage | Count of devices in the originator field |

Figure 6B

| D10 | Games | Basic or extended downloaded games |
| D11 | Music* | MP3 sound tracks |
| D12 | Clock/Timer | Clock and timer function. Messages could be |
| D13 | Add-On modules* | Add new games, capacity, speed, and functionalities |
| D14 | Service Enable function* | Application enabling the services listed in the first section of this document. |

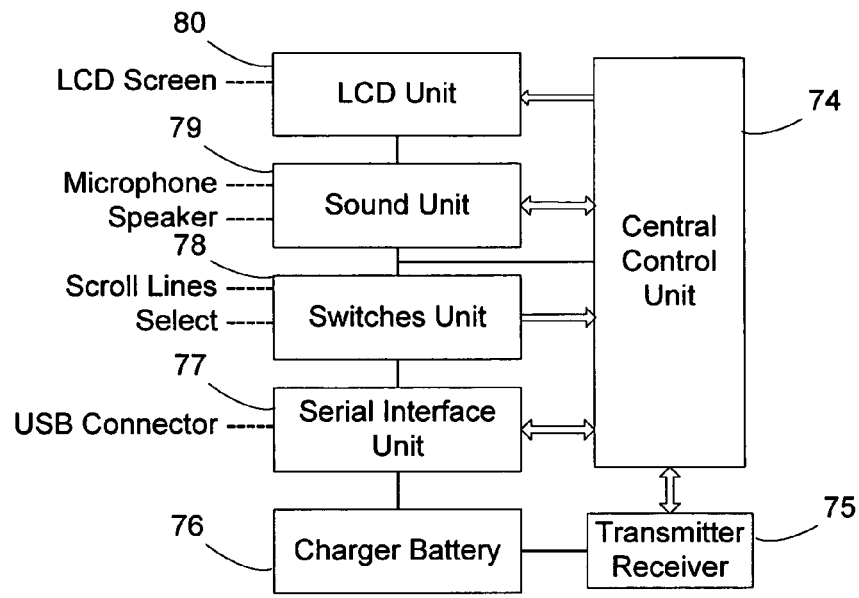
Figure 15
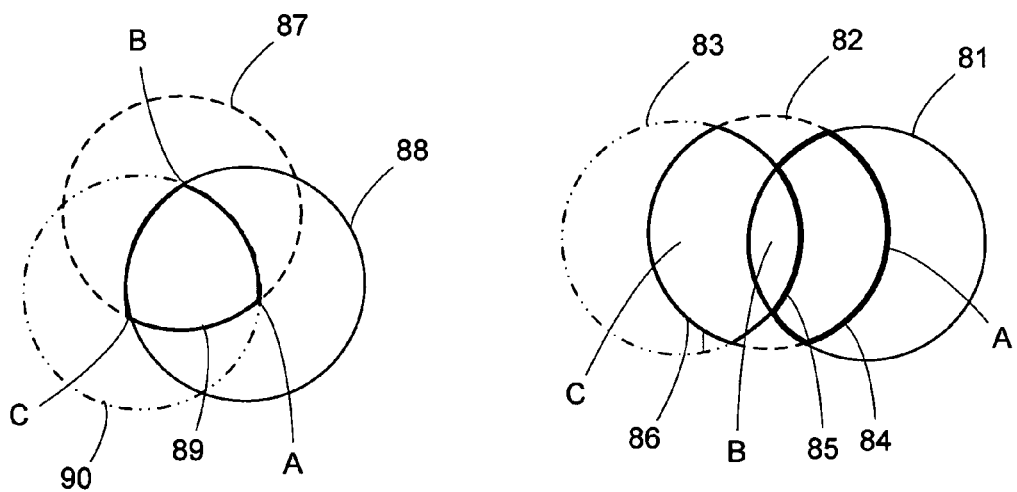
Figure 16
Figure 17

| Service Level | Service package | Allocated message space | Notes |
|---|---|---|---|
| Standard –std | Profile | 25% | Personality preferences and matches |
| Extended –E1 | Pickup Line | 5% | Diffuse the id of the closet cell to the designated reference device |
| Extended –E2 | Queue | 5% | Diffuse the id of the newest id joined the cluster. Reference device calls designated devices |
| Extended –E3 | Recognition I | 15% | Device receive announcements from businesses at vicinity |
| Extended –E4 | Recognition II | 40% | Customer device's id recognized and treated with adapted message to its profile |
| Extended –E5 | Game | 10% | Limited number of games such chess and other strategic games. Playing single or double against other devices or the system |
| Extended – E6 | Capacity, Power, and Color | NA | Add more memory chips, larger battery, and a color LCD screen. This is a hardware addition that will enable loading addition games onto the additional memory space. |
|  | Grand Total | 100% |  |

Figure 19

DEVICE, METHOD AND SYSTEM FOR WIRELESS COMMUNICATION AND USES THEREOF

CROSS-REFERENCE TO RELATED APPLICATIONS

This nonprovisional application claims benefit of priority under 35 U.S.C. §119(e) of provisional application U.S. Ser. No. 61/220,235, filed Jun. 25, 2009, now abandoned, and of provisional application U.S. Ser. No. 61/153,887, filed Feb. 19, 2009, now abandoned, the entirety of both of which are hereby incorporated by reference.

BACKGROUND OF THE INVENTION

1. Field of the Invention

The present invention relates to the fields of computer science, wireless communication and information technology. More specifically, the present invention discloses a method and apparatus for wireless communication using multi-relayed broadcasted keyed transmission scheme to extend the overall distance reach of short packets of voice and data messages without an interconnecting system. The method and apparatus are useful in, inter alia, paging, profile match rating and sales management systems.

2. Description of the Related Art

There have been several attempts to devise systems and methods for multi-ended wireless communication systems that serve to communicate short voice and data messages. Previous art systems describe specialized electronic apparatus or mobile terminal emitting and receiving wireless signal with an interconnecting system such base-station in case of personal wireless systems or with another similar terminal. The communication itinerary is formed of (a) one leg in case of two terminals directly communicating, or (b) two legs in case of two terminals connected through an interconnecting system.

Previous art systems describe specialized electronic apparatus or tag emitting and receiving infrared signals with another similar tag placed in front of it to allow signal reach. Previous art systems describe the apparatus information covering personal favorites and likes, votes, speech, and data. The apparatus connects to computers via wireless and or wired connections and provides for exchange of a multitude of data. See, for example U.S. Pat. Nos. 6,329,908, 6,587,835, 6,647,257, and 7099831 and U.S. Publication Nos. 20040189474, 20040189476, 20060195354, 20070198324, and 20070236334.

The prior art is deficient in a low cost multi-ended wireless communication method for short messages without the need of an interconnecting system. The present invention fulfills this long-standing need and desire in the art.

SUMMARY OF THE INVENTION

The present invention is directed to a portable, hand-held electronic device for wireless communication. The device comprises a means for wirelessly transmitting and receiving one or both of a message or other content, a means for recording, storing and retrieving the message or other content, a means for displaying the message or other content, and a means for indicating receipt of the message or other content. The present invention is directed to a related device further comprising a means for connecting to a USB port in a computer having a memory, a processor and at least one network connection. Both devices comprise an addressable point in network (Pin) having an originator address where the Pin is configured to relay wireless signals containing one or more destination addresses for each message or other content to one or more other Pin devices and a relaying mechanism with a radio frequency transmitter and receiver. Also, both devices comprise a memory having a trace queue, a send queue and a receive queue, where the contents of the queues is reorderable and removable.

The present invention also is directed to a method for communicating over a wireless network. The method comprises relaying one or more messages or other content as one or more wireless signals from one or more devices described herein where each device comprises an activated addressable point in network (Pin) to one or more other Pins over the wireless network. Relaying comprises listening for all wireless signals over the wireless network available to the Pin(s) within its field of coverage when the Pin(s) is not transmitting. Comparing destination, receiving and originator Pin addresses and the message flags within received messages carried by the signals with message flags in the device memory trace queue is useful to determine the status of the receiving Pin and whether the received message is retained and/or relayed or dropped.

The present invention is directed further to a system for wireless communication. The system comprises one or more of the wireless electronic devices described herein where each of the devices comprises an addressable point in network and an enterprise provider information system (PIS) having an application stack configured to wirelessly transmit product and services information to the Pin(s) upon detecting the Pin(s) address within a field covered by the PIS and to receive messages from Pin(s). The system also comprises a wireless network over which the information is transmitted to and received from the Pin(s). The present invention is directed to a related wireless communication system further comprising a computer having a memory, a processor, one or more USB ports and at least one network connection and one or more web services accessible to the device(s) over the computer network connected to the device. The application stack supports paging services, universal profile match rating services and sales management.

The present invention is directed further still to another method for wireless communication. The method comprises transmitting one or more wireless signals containing one or both of product or services information to one or more receiving Pins over the wireless communication system described herein. The present invention is directed to a related wireless communication method further comprising relaying the transmitted wireless signals from the receiving Pin(s) to one or more Pins within a field of coverage of the receiving Pin(s) or to one or more Pins in one or more fields of coverage overlapping the field of coverage of the receiving Pin(s). The present invention is directed to another related wireless communication method further comprising relaying a message to the PIS in response to the PIS transmission.

Other and further aspects, features, and advantages of the present invention will be apparent from the following description of the presently preferred embodiments of the invention. These embodiments are given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

FIG. 3 shows the system architecture application stack of the Pin and the web services.

FIG. 4 shows the basic web service features.

FIG. 5 lists the additional features covering all of W1 to W4 in FIG. 4.

FIGS. 6A-6C is a list of features offered by dedicated server-based application software for the enterprise category service level.

FIG. 7 shows the message's signal composition with or without encryption.

FIG. 15 shows the architecture block diagram of the Pin.

FIG. 16 shows one basic case of wireless radio coverage overlap between 3 Pins in close proximity.

FIG. 17 shows one basic case of wireless radio coverage overlap between 3 Pins in close proximity.

FIG. 19 shows the service level options.

DETAILED DESCRIPTION OF THE INVENTION

Figure 1:
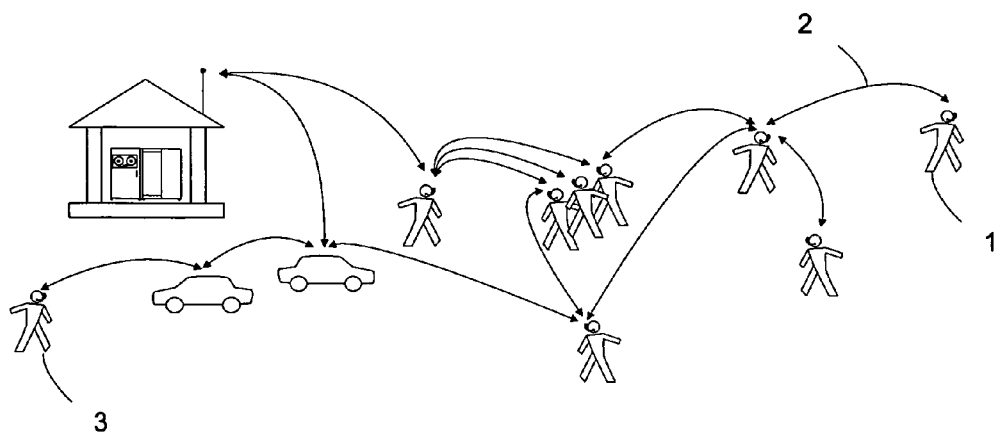
FIG. 1 shows the bounding concept of the communication protocol where a single message could travel between multitudes of Pins. One of the relaying Pins could travel a long distance far from where it received the signal and transmit back again.

As used herein, the term "a" or "an", when used in conjunction with the term "comprising" in the claims and/or the specification, may refer to "one," but it also is consistent with the meaning of "one or more," "at least one," and "one or more than one." Some embodiments of the invention may consist of or consist essentially of one or more elements, method steps, and/or methods of the invention. It is contemplated that any method or composition described herein can be implemented with respect to any other method or composition described herein.

As used herein, the term "or" in the claims is used to mean "and/or" unless explicitly indicated to refer to alternatives only or the alternatives are mutually exclusive, although the disclosure supports a definition that refers to only alternatives and "and/or."

As used herein, the term "voice element" refers to an electric signal captured at a sound transducer, sampled, coded, and stored in memory with a defined duration, for example, but not limited to, about 10 seconds.

As used herein, the term "data element" refers to an electric signal representing data messages stored in memory with a defined number of digits.

As used herein, the term "message" refers to a voice and/or a data element encapsulated in a packages of flags.

As used herein, the term "message composer" refers to a function that builds a message from element and flags.

As used herein, the term "message decomposer" refers to a function that separates the message to its element and flags.

As used herein, the term "Pin" (point in network) refers to an element embodying the disclosed apparatus composed of one transmitter and one receiver, and capable of sending and receiving message. in some occasion it is referred to as device. The Pin may be a battery-powered handheld electronic card.

As used herein, the term "Pin address" refers to a specific address of a device.

As used herein, the term "originator Pin" refers to the device that originates a message.

As used herein, the term "originator address" refers to a flag containing specific fixed code assigned to the device sending the message.

As used herein, the term "receiver Pin" refers to a device that receives a message.

As used herein, the term "destination Pin" refers to the device that has its address matching the destination address of the message.

As used herein, the term "destination address" refers to a flag containing specific fixed code assigned to the device receiving the message.

As used herein, the term "field" refers to a wireless communication area covered by one Pin.

As used herein, the term "bound" refers to the trip that a message crosses when passing from one field to an adjacent field.

As used herein, the term "repeat" refers to a flag indicating the permitted message bounds: decremented after each message's bound.

As used herein, the term "type" refers to a flag indicating the type of the message, for example, but not limited to, voice, data, local, marketing, etc.

As used herein, the term "order" refers to a the number of the message sent by a device during a specific period of time, for example, but not limited to, about 24 hours.

As used herein, the term "trace" refers to a combination of message flags and other additional data, such as, an originator address, order, and send priority ranging from 0, the lowest, which indicates not to send, up to 10, the highest priority which indicates to send first.

As used herein, the term "channel" refers to a the frequency used by the device.

As used herein, the term "transmitter" refers to a the function in the device that sends the message on a determined frequency channel using different types of modulation.

As used herein, the term "receiver" refers to a the function in the device that receives the message on a determined frequency channel.

As used herein, the term "originator transmitter" refers to a transmitter function at the originator device.

As used herein, the term "destination receiver" refers to a receiver function at the destination device.

As used herein, the terms "computer" or "PC" refer to computers comprising at least a memory, a processor, one or more USB ports and a network connection as is standard and commonly known in the art.

In one embodiment of the present invention there is provided a device for wireless communication, comprising means for wirelessly transmitting and receiving one or both of a message or other content; means for recording, storing and retrieving the message or other content means for displaying the message or other content; and means for indicating receipt of the message or other content.

Further to this embodiment, the device comprises means for connecting to a USB port in a computer having a memory, a processor and at least one network connection. In this further embodiment, in a first instance of use, the device acquires its configuration attributes, ID and password over the computer network.

In both embodiments the means for wirelessly transmitting and receiving may comprise an addressable point in network (Pin) having an originator address, said Pin configured to relay wireless signals containing one or more destination addresses for each message or other content to one or more other Pin devices and a relaying mechanism with a radio frequency transmitter and receiver. Also, each Pin may be configured to listen, to create and to transmit the wireless signals sporadically with or without a predetermined pattern. In addition, each Pin may be configured to listen for all available wireless signals when not transmitting. Furthermore, each Pin may be configured to further transmit a wireless signal received or transmitted by the Pin when the received or transmitted signal is not followed by a matching signal within a limited time period. Further still, each Pin may be configured to keep and to not retransmit the message or other content contained in a received wireless signal if the signal comprises information that the receiving Pin is the intended destination.

Also, in both embodiments the means for recording, storing and retrieving the message or other content may comprise a memory having a trace queue, a send queue and a receive queue, where the contents of the queues is reorderable and removable. The trace queue contains identifying flags of messages received by the PIN. The send queue contains Pin transmittable messages having an assigned priority of transmission. The receive queue contains received messages for the Pin.

In another embodiment of the present invention there is provided a method for communicating over a wireless network, comprising relaying one or more messages or other content as one or more wireless signals from one or more devices described supra, where each comprises an addressable point in network (Pin) to one or more other Pins over the wireless network.

In this embodiment the relaying step comprises listening for all wireless signals over the wireless network available to the Pin(s) within its field of coverage when the Pin(s) is not transmitting. Also, the relayed wireless signal may be relayed within a field of coverage of the Pin originating the signal or relayed from one or more Pins in one or more field of coverage overlapping the field of coverage of the originator Pin. In addition, the message or other content may comprise voice messages, data, games, music, personalized promotional advertisements, personality matched attributes, universal likes matched attributes, services offers, sales offers or bids, general information packets.

In one aspect of this embodiment the Pin may receive a wireless signal with a destination address matching the receiving Pin address where the method comprises comparing message flags in the message or other content comprising the received wireless signal with message flags previously received and stored in the trace queue comprising the device memory to determine if the message is new or previously received. Further to this aspect, if the message flags match, the received message is a previously received message and the method comprises discarding the received message and prioritizing the remaining queued messages. In an alternative further aspect, if the message flags do not match, the received message is a new message and the method comprises storing the received message in the trace and received messages queues or activating one or more other functions comprising the device.

In an alternative aspect of this embodiment, the Pin may receive a wireless signal with a destination address that does not match the receiving Pin address where the method comprises comparing the originating Pin address with the receiving Pin address to determine the origin of the received signal. Further to this aspect the originator address may match the receiving Pin address and the method comprises updating the memory queues if the received message flags match the message flags comprising the trace queue; where the received message was relayed back to the receiving Pin previously or, alternatively, adding the received message flags to the trace queue and removing the original sent message from the send queue, if no match is found; where the received message is a first relay back to the receiving Pin. In an alternative further aspect, the originator address may not match the receiving Pin address and the method comprises adding the received message flags to the trace queue and adding a copy of the message to the send queue with an assigned priority of transmission. Further still to this alternative aspect the method comprises transmitting the wireless signal carrying the message to one or more other Pins if no matching second signal follows the first received wireless signal within a random limited period of time.

In yet another embodiment of the present invention there is provided a system for wireless communication, comprising one or more of the wireless electronic devices described supra each comprising an addressable point in network; an enterprise provider information system (PIS) comprising an application stack configured to wirelessly transmit product and services information to the Pin(s) upon detecting the Pin(s) address within a field covered by the PIS and to receive messages from Pin(s); and a wireless network over which the message(s) or other content is transmitted to and received from the Pin(s). Further to this embodiment the system comprises a computer having a memory, a processor, one or more USB ports and at least one network connection and one or more web services accessible to the device(s) over the computer network connected to the device.

In both embodiments the PIS application may comprise paging services such that the application enables the transmission of data messages containing a page for one or more specific users' Pin addresses. Also, the PIS application may comprise universal profile match rating services such that the application enables the transmission of data messages containing a user's profile comprising personal attributes, specific merchandise likes and dislikes to one or more other specific profile matched users' Pin addresses. In addition the PIS application may comprise sales management such that the application enables the transmission of data messages containing sales offers or bids, product or service information, general information packets provided by the enterprise to specific users' Pin addresses or as a general broadcast to all Pins within the field covered by the PIS. In all these examples, the PIS applications may be configured for use in schools, universities, colleges, stadiums, business or retail premises, hospitals, within a city block, or similar areas.

In yet another embodiment of the present invention there is provided a method for wireless communication, comprising transmitting one or more wireless signals containing one or both of product or services information to one or more receiving Pins over the wireless communication system described supra. Further to this embodiment the method comprises relaying the transmitted wireless signals from the receiving Pin(s) to one or more Pins within a field of coverage of the receiving Pin(s) or to one or more Pins in one or more fields of coverage overlapping the field of coverage of the receiving Pin(s). Further still the method comprises relaying a message to the PIS in response to the PIS transmission.

In all embodiments the wireless signal may be relayed from the PIS when the Pin(s)' address is detected within the PIS field of coverage. Also, the wireless signal may be relayed as a general broadcast to all Pin(s) detected within the Pin(s) or PIS field of coverage or relayed to specific Pin addresses.

Provided herein is a system, apparatus or device and a method to provide a low cost and simple personal wireless communication method not needing any dedicated interconnecting system for relaying messages across single device radio coverage and can serve multitude of purposes such personal communication, promotion marketing, and personality matching. The system is a specialized electronic apparatus called hereafter Point In Network (Pin) transmitting sporadic short-duration limited-distance-range wireless signals bearing information indicating the intended destination of each message. The destination does not need to be limited to one specific Pin address and not limited to a specific geographic location. The Pin operates in the unlicensed radio frequency zone and provides time delayed voice and data messages to and from other Pin users.

A system comprises the wireless portable device and supporting web services. The device continuously relays voice and data short messages with other similar devices in proximity. The relaying mechanism is the method of transmitting the messages that are not reached in the immediate proximity. Each device has its own address and uses sophisticated algorithms for the relaying mechanism to assure the optimal battery life. Each device continuously acts a temporary carrier for other devices' messages until the message reach destination. The device allows the user to record voice and to enter data messages to transmit to specific addressed device or to broadcast. The message relaying distance measured by the number of bound between devices, type of message and other attributes are controlled by type of a user account set from the corresponding web service. The device supports the personal communication services, the publicity services, and the personal likes and character match services.

A group of attributes controls the Pin for the duration of the messages, radio frequency spectrum, data and channel coding algorithms, modulation type, memory bank size, and other technical aspects. The Pin enables the user to record a voice message, transmit it along with other predefined data messages, and receive a voice message along with other data messages. Each message is relayed from one Pin to another until it reaches its intended destination(s) that are beyond the single leg wireless coverage or vanish. The overall connectivity does not use nor rely on neither fixed network elements nor a central database to interconnect and relay the messages between Pins.

The operations by which the Pin listens, creates, and transmits are governed by a sophisticated relaying mechanism and obey the following rules: 1) Every Pin is capable of listening, creating, and transmitting the wireless signals sporadically with or without a predetermined pattern; 2) While the Pin is not transmitting, it listens for all available signals; 3) For every first signal the Pin receives or transmits that is not followed by a second matching signal during a random limited period of time, the Pin transmits it, i.e., the first signal; 4) If the information carried in a received message indicates the actual receiver Pin as intended destination, the this later Pin keeps the message and don't transmit it.

The Pin is embodied in a small, hand-held or carried device. The Pin connects to a computer via a USB port to receive the electrical charging power for its internal battery and to browse to a web service site and to establish a communication path to validate the Pin for the first time use with an ID and a password. The remote application populates the configuration attributes of the device.

The user performs the configuration, upgrade services, store the data and unplug the device. None of the private information resides on the external interface or on the services websites. The user starts using the device and exchange messages with other devices the way dictated by the configured services.

Different levels of services are available with multitude of feature sets that the user can configure the Pin with. For example a super Pin can have a backend system that creates and reply to specific messages automatically. There are no limits for the capabilities and functions of such backend systems which useful at the enterprise level of service.

For example, the retailers reach out to the customer through several marketing means: newspapers, magazines, mail, radio, TV, billboards, door-to-door, Internet, etc. To evaluate all these marketing tools and to understand customer preferences and buying tendencies, the retailers have studied the sales and the profit margins of announced items. This approach constituted a macro level analysis. New technologies and services brought personalized profiling methods such as customer account cards, discount cards, etc. With the use of advanced algorithm these serve to feed the marketing tools (offers and discount/sales announcements) to attract the customers on the spot to specific group of product where profit would be optimized considering cost of operation, fixed cost, and a large amount of historic data related to season and other. The ideal marketing and sale approach would be to personalize the contact with the customer further to individual level and interact with him on the spot around the aisles while he is looking at the items and sure before getting to the register when it is already too late. The Pin provides the ideal solution to this approach by reaching interactively to the customer.

The enterprise reaches to the customer in-vicinity of the store. When Pin customer is checked in the vicinity of the store subscribed with the Pin Retail services (Service Program for the enterprise content providers), the Pin will receive personal and real time messages. These messages will depend on the business nature of the enterprise. Acknowledgment messages, such in the case of a waiting queue at a school pickup line, restaurant checking/seating waiting line, or discounts, rewards, and announcements messages such in the case of a retail store.

The enterprise reaches to the customer in-vicinity of the store in-store. When a Pin customer enters the store, he or she is welcomed at the entrance. Devices permanently mounted at the entrance detect the passage of the customer. A Pin customer wandering around the departments in the store will receive messages offering him or her special items in that department. Devices mounted at each department space will indicate the nearby presence of the customer (indicated by the bound count of the message, bound should be 1 to indicate nearby presence) in that department which will trigger the announcement. These items could belong to one of the categories that the customer had already marked/checked on his personal profile with that content provider. These items could belong also to a general discounted group. The Pin customer will also be encouraged to use and respond favorably to the messages by rewarding him at the cash register in real time with credit points against his purchase or the future ones. Each item in the store could have a Pin attached to it or close besides it and lists the characteristics in the matching criteria. Once the user get close to the item's Pin the message are exchanged and the user's Pins indicates the liking compatibility with that item. The item profile should have already been filled by the content provider. The user should also have filled his like profile and coded it in the Pin via the web services.

The enterprise could use private user Pins to reach to customers. Depending on the category, type of service, and private user approval (the private user could be monetary compensated or offered certain discounts to gain his approval), a private Pin device connected to a content provider on the web will be loaded with a message that his or her device will transmit on a regular basis to market certain product, items, website, or services that provider is looking to market.

People at all ages are interested in knowing their "chemistry match" or "likeness" with other people or with items such cars, houses, laundry machines, etc. Pin user connects to a webpage of the content provider, logs to his/her account, fills out a profile and load it (after been processed in specific method) into the device. Personal information is treated accordance to laws and regulations. Pin device provides to the user the knowledge of the degree of the match of his personality profile with the personality profile of the people surrounding him. Pin device keeps transmitting and receiving regularly data messages containing profile attributes. The highest matching profiles will be displayed on the device screen and displayed on the Pin browser once the device is connected to a PC. The user has the capability to limit his profile sharing, to send and exchange messages next time in the pass by his best match. The user Pin doesn't need to be in immediate vicinity of the intended receiver because the message will be bounding over multitude of Pins until it reach destination.

The present invention also provides a system, method, and apparatus to build and provide the service application for the user to receive and send data messages from or to specific addressee or general public broadcasts anywhere anytime where these messages are personalized promotional advertisement, personality and or universal like match attributes, sales offers or bids, and general information packets. The users relay the messages continuously thus extending the coverage area of the system reach. The system, method and apparatus comprises the Pin, Web Services (WS), and a service application stack, i.e., Provider's Information System (PIS).

In this system the PIN replaces the regular membership "dummy" plastic cards and the majority of the paper coupons and flyers with high-tech interactive technology. This concept brings faster response to consumer and efficient control of sales. Without being limiting, three major application categories of the present system are paging, universal profile match rating and sales management. Paging applications requires the basic set of functionality. Additional processing increases the functions' set to deliver the profile matching application. Using all functionalities grouped together with advanced processing at the service provider level enables the marketing application. The system and applications disclosed herein are well suited for use at schools, colleges, universities, stadiums, city blocks, business premises, hospitals, retail stores, and similar areas.

The possibilities are endless and the PIN-PIS concept accommodates multitude of other scenarios and options. For example, an important service is to offer the same toll services to other providers in one form as promoting their services part of the broadcast interaction while users are on premises or to provide the complete service including the product and operation. The user can consult the received promotions any time, select what he wants and once he is connected back to the web service provider or on provider premises his selections are communicated to the PIS for treatment and counter-offer. A whole new limitless world of transaction opens.

Embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1 represents the real life phenomena of the moving communication clusters. A message sent by one Pin 1 reach directly the adjacent Pin in his cluster and gets relayed at 2 by the multitude of adjacent clusters until reaching its intended destination 3. It could happen that a gap split apart clusters but this won't make much difference as the Pins will move eventually while the messages are stored in memory and get relayed. The device and system do not provide 100% transmission of messages. It is possible that some transmitted messages will never reach their destinations because of gaps or accidental, simultaneous transmission of adjacent pins, instead it is a very low cost and reliable service in dense environments.

Connecting to a computer communication port, such as are known and standard in the art, a USB port, a parallel port or a serial port, the private Pin user can browse and log onto private web services and can use the offered services, such as updating the device software release and getting technical support and new product and accessories promotions. The basic private features are listed in FIG. 4. The address book is built as part of the W2 feature. Through the W3 feature, the private users can extend their services to set different levels, as listed in FIG. 19. The enterprise Pin user has additional features, shown in FIG. 5, that covers all the features W1 to W4 in FIG. 4 and adds the account management W5. This feature provides the enterprise with the ability to manage their account, upload new ads, and configure their product profiles.

Figure 2:
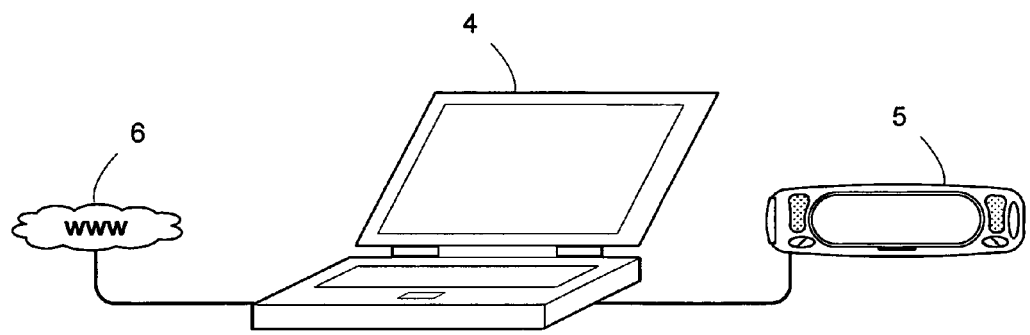
FIG. 2 shows the basic setup for connecting the Pin to a web service.
Figures 6C, 7:
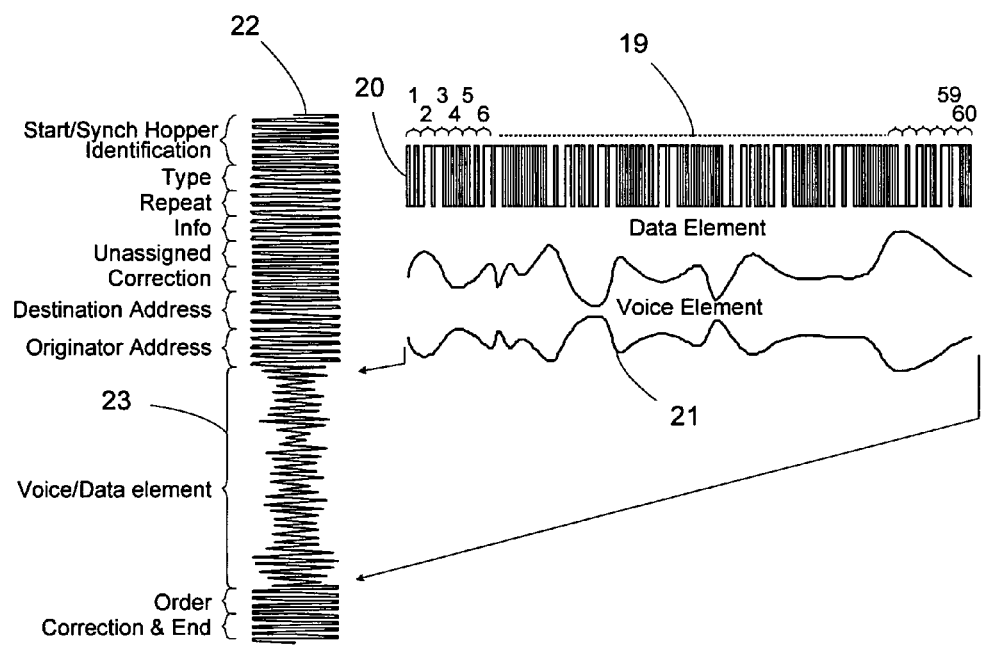

FIG. 2 shows the PC 4 connected to the World Wide Web 6 where a dedicated application, such as listed in FIGS. 6A-6C, can run to support the enterprise Pin 5. The enterprise Pin is the base model Pin with an extended memory option.

FIG. 3 shows the 3-layer stack embedded system in the Pin: the physical layer 18, the logic layer 17, and the application layer 16. The physical layer is responsible for the wireless communication, the USB communication, and the user interfaces. The logic layer manages the protocols and service levels. The application layer insures the interaction with the web services over the internet. A supplemental layer is provided in the external web service interfaces. This layer is put into two services categories, private and enterprise 15 that are associated with the type of users. The private category layer uses the Pin in private mode. This is intended for general use for all users. The enterprise category layer controls the Pin for the enterprise interface. This is intended for the enterprise users referred to as "content providers". These users are typically enterprises that are given the rights to transmit messages to a predetermined field coverage defined in the repeat flag. These types of enterprise users generally run publicity ads, run matchmaking web services and paging communication systems anywhere, such as, but not limited to, hospitals, schools, buildings, etc.

The private user can read a message, listen to message, enter a message, send a message, reply to a message, play pre-programmed games, listen to music, and, using a PC, connect to the Pin private web services and use the offered services. The enterprise user can do all what the private user able to do with the Pin and also using a PC connect to the Pin enterprise services and use the offered services.

FIG. 4 shows the list of the basic private features W1, W2, W3, and W4 available to a private user. W1 is device activation and registration, W2 is device configuration, and W3 and W4 are optional features download and reporting lost device, respectively.

FIG. 5 shows the list of the basic enterprise features which include the private features W1-W4 and W5 which is account management.

FIGS. 6A-6C show the list of features that a dedicated server-based application software offers for the enterprise category service level to provide more advanced and speech recording functionalities and database administration for customer records management. Whereas a private Pin user is exchanging messages back and forth in limited jumps depending on their service level the enterprise Pin user uses the management application system to control the generation and reception of central messages. For example, application program features or services are voice and data message recording P1, text to voice P2, interactive communication P3, and database management P4 respectively. Device features D1-D4, are the external power source D1, create a message D2, send a message D3, reply to a message D4, voice note, D5, address exchange D6, PC/Web communication D7, who's my neighbor D8, coverage D9, games D10, music D11, clock/timer D12, add-on modules D13, and service enable function D14 enabling the features or services P1-P4.

FIG. 7 is a view of the voice 21 and or data element 20 and its inclusion between the data flags to construct a complete message 22. The data element is composed of constructive element called bytes indexed by the tallying 19. It shows an example of different type of radio frequency modulation applied to the different sections of the message. The message composer creates a message from a voice or data element at the originator Pin. The message contains the originator address and the destination address.

Figure 8:
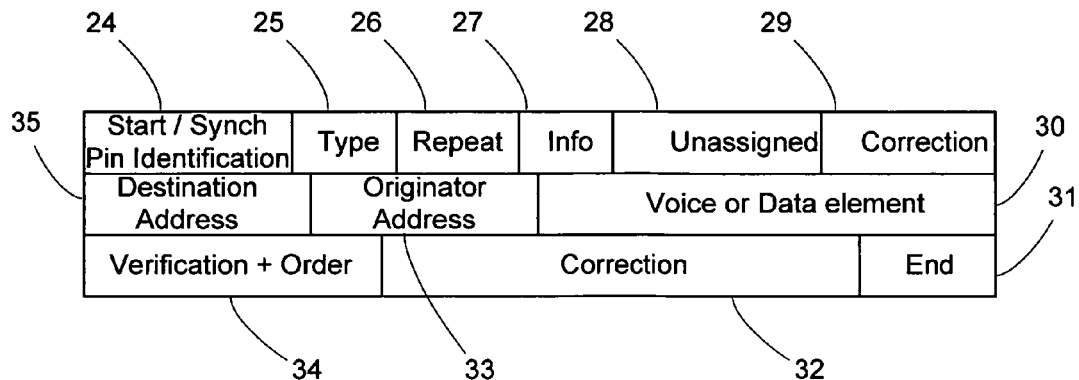
FIG. 8 shows the message packet composition with or without encryption.

FIG. 8 shows the complete message with flags: Start/Synch Pin Identification 24, Type 25, Repeat 26, Info 27, Unassigned 28, Correction 29, Destination address 35, Origination Address 33, Voice or Data Element 30, Verification and Order 34, Correction 32, and End 31.

Figure 9:
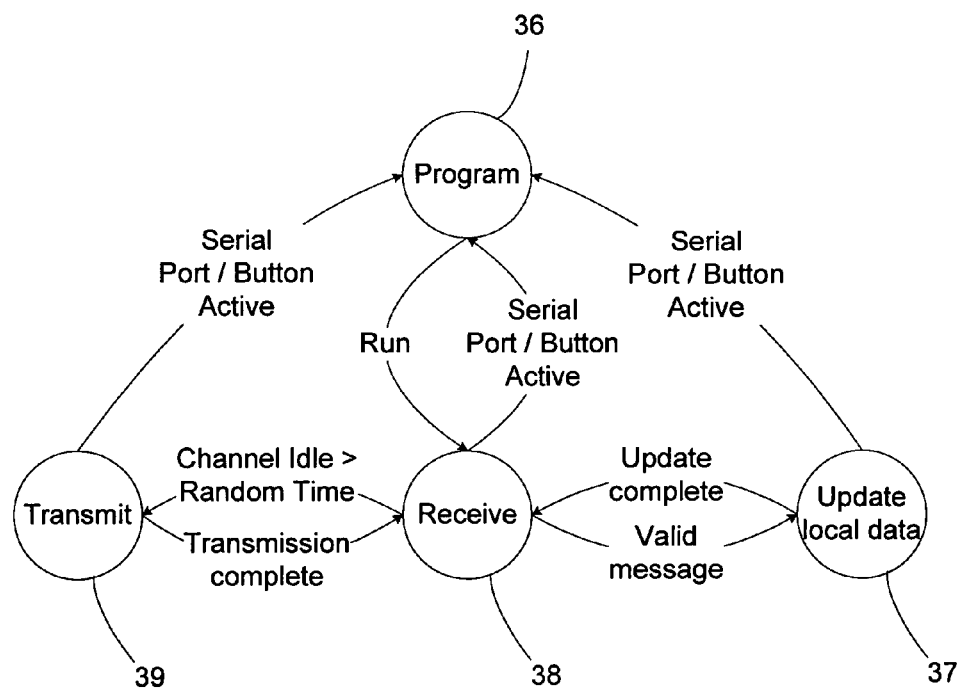
FIG. 9 shows the states that the Pin can be in at any point in time.

FIG. 9 shows the four logic states that the Pin can be in at any given moment: the program state 36, the update local data state 37, the receive state 38, and the transmit state 39. The Pin change states when triggered by the changes indicated by the arrows. In the program state, when connected to the PC via the USB port, the Pin is downloading flow of data (could be message or control attributes) or uploading received messages. In the receive state the Pin is listening to the radio frequency channel and receiving data. In the update local data state the Pin is processing the received data. In the transmit state the Pin transmits the messages in the transmit queue. Plugging the Pin in the USB port of a PC will move the Pin to the program state and the connected web service will control the operation of the Pin by the Run command.

Three memory queues are created in the Pin: trace, send, and receive queues. The trace queue collects identifying flags of the received messages. It occupies the majority of the memory of the Pin. With optional replacement of the LCD package, additional memory could be used to enlarge the trace queue. The send queue collects the complete messages that the Pin set to send. The receive queue collects the received messages intended for the current Pin. The queues are revised periodically by going over the queues and removing the empty locations and bringing the valid records together in one block. This improves the efficiency of the lookup codes that run to search in the queues. Also the revise routine deletes the oldest records or the less priority records if the queues get full and have no space for additional records. This revision routine is executed in block 91 of FIG. 11.

Figure 10:
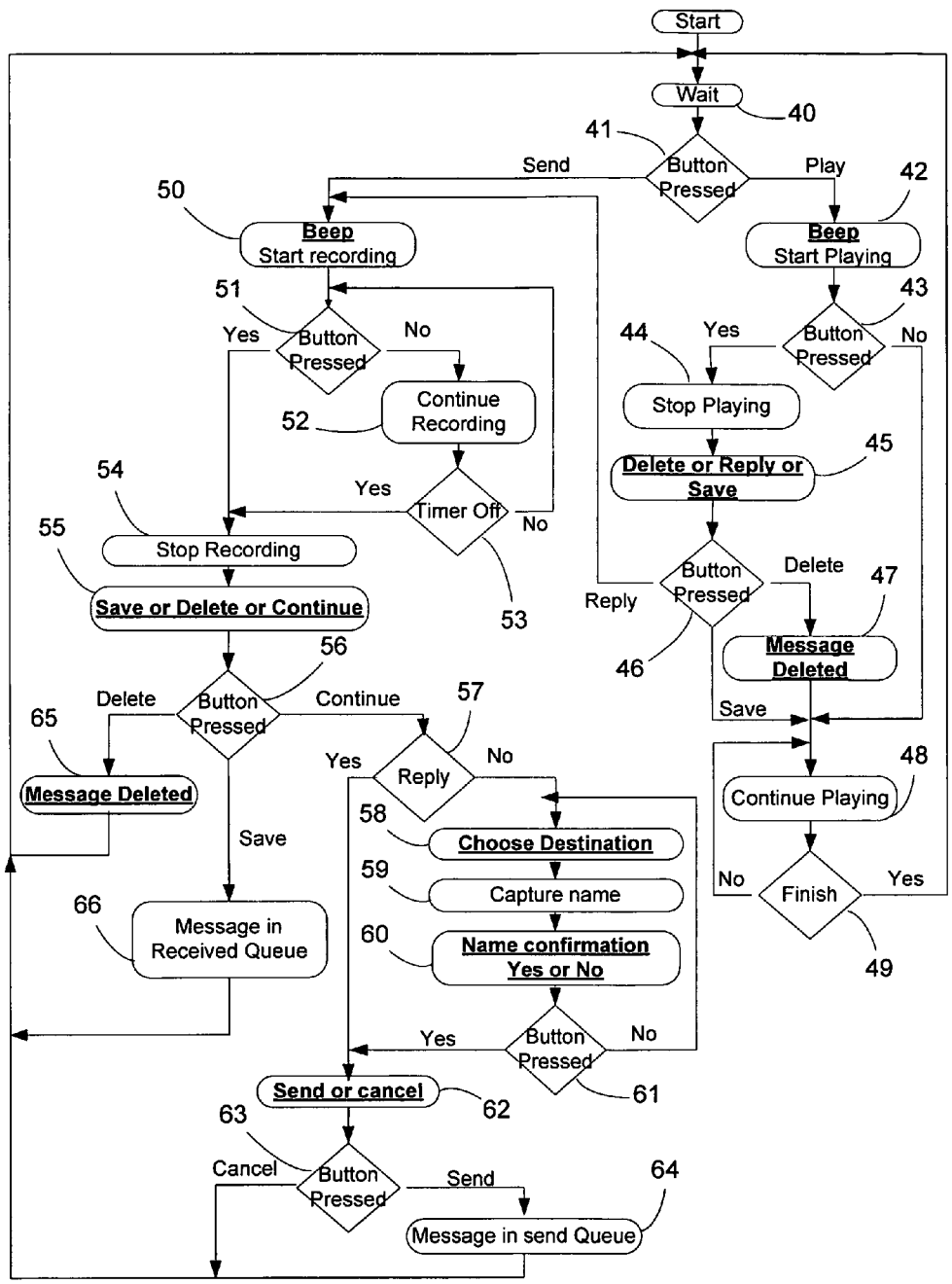
FIG. 10 shows the Pin operation flow for managing the messages received and for preparing messages to send.

FIG. 10 shows the operation flow for the user to interact with the Pin. After being in a wait mode 40 if the Play push button is pressed 41, then the Pin emits a short beep tone and starts playing the messages 42, if the message is a voice message, or displays it on the screen, if the message is data. If no button 43 interrupts playing the message, the operation continues 48 until the last message is played or read, then the finish is detected 49 and the Pin sends the operation to the wait state 40. If the button 43 was pressed to stop 44, then a message will be displayed offering the options of deleting, replying, or saving 45.

Depending on the choice 46 the flow could continue toward deleting the message where the message will be deleted and the confirmation will be displayed on the screen 47. Saving the message results in the continued playing 48 of the next messages. Replying to the message takes the same route as send a new message. It starts with a short beep tone and a message on the screen to start recording 50 until a button 51 is pressed to stop recording 54 or the recording continues 52 until a timer reaches its limit 53. This timer assures the limit of the short voice message size. This also applies for the data messages, but the timers will count the number of characters instead of seconds.

Once the message is recorded the display prompts the menu of save and continue or delete and continue 55. With the delete menu selected by the select push button 56, a confirmation message is displayed 65 and the Pin goes back to the wait state 40. If the reply menu was selected, then the reply choice 57 will distinguish whether it was a reply operation or a new message. In case of a new message the address book is displayed to choose the destination 58, afterward the name of the destination is collected or captured 59 and displayed 60 for confirmation. If the scrolling button is pressed than the name is not selected 61 and the address book is displayed again. When the name is selected the message is ready to be send and a menu message will be displayed to send or to cancel 62. By pressing the select button 63 the message is put in the message queue and the Pin goes back to wait mode 40. If the cancel menu is selected, then the message is deleted and the operation goes back to wait mode 40.

Figure 11:
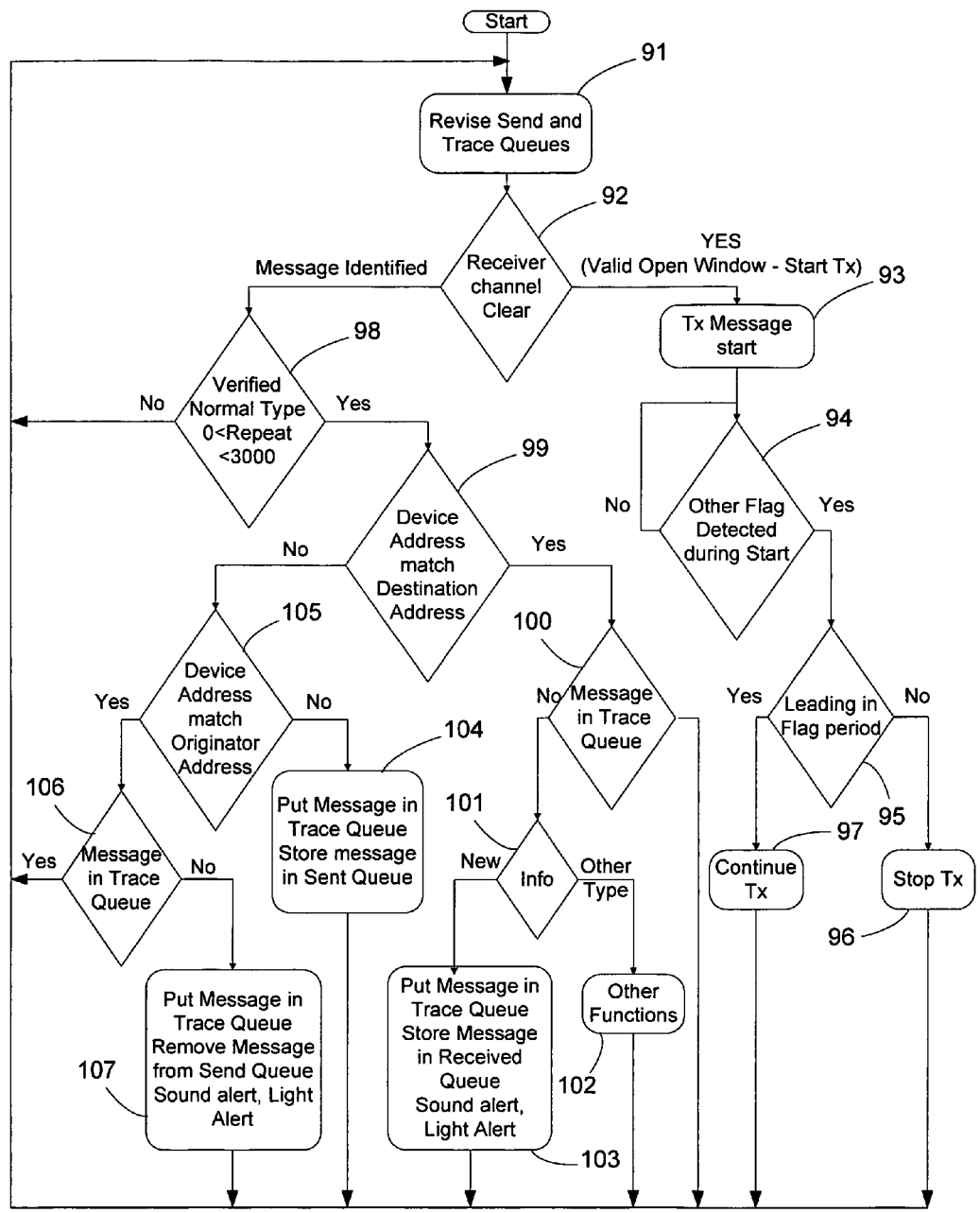
FIG. 11 shows the Pin operation flow for managing the relaying mechanism.

FIG. 11, with continued reference to FIG. 8, shows in greater details the move between transmit, received, and updates local data states. The Pin starts by rotating the trace queue and rearranges the send queue by order of priority 91. After housekeeping the trace and send queues, the Pin receiver listens to the radio waves to detect a clear time window 92 to move into the transmit state. If a valid open window is detected, the Pin picks the first message in the transmit queue that has the highest priority and its transmitter starts transmitting 93. The Pin listens to the radio wave during the first packet of the message 94 to detect any collision with other Pin transmitting in the same time window by finding the leading flag 95.

If the transmitting Pin is leading by a certain threshold than the transmission continues 97 and the Pin is in the transmit state. If the colliding Pin is leading, which means that the time window was not valid for many reasons which depends upon the colliding Pin entering into the field at the exact moment of transmission and so forth, the transmission stops 96 and the state goes back to update the queues 91. In the case where the receiver didn't catch a valid window for transmission and a received message was identified 92, and if the type flag 25 checks to normal and if the repeat flag 26 checks less than 3000 98, then the message is considered valid and is treated, otherwise the message is discarded and the Pin goes back to update the queues 91.

With a valid message the check point 99 validates that the current Pin is the intended receiver by checking the destination address packet 35 to the Pin actual address. If the packet destination address matches the current Pin than the messages flags are compared to the messages flags previously received and stored in the trace queue. If the flags find their matches in the trace queue 100, this means that the message was previously received and therefore could be discarded and the Pin goes back to the update queues 91. If the flags didn't match any of the ones in the trace queue this means that this received message is new and the current Pin checks 101 its info flag 27. Depending on this flag setting, the message is either stored in the trace and the received message queues with a sound alerting the user and indication on the screen 103, or the message is used to activate other functions 102.

If the destination address doesn't match the current Pin, a second checkpoint 105 verifies if the originator address matches the current Pin address. If the two addresses match, this means that this message was sent from the current Pin and relayed back by other Pins. The fact that other Pins relayed back means that the message was in a previous time sent correctly and received correctly by other Pin. The current Pin checks this message flags with all the ones in the trace queue 106. If a match is detected it means that this is the 2+n times that the message is relayed back therefore the current Pin doesn't need to anything for it and updates the queues 91. But if there is no match in the trace queue that indicates that this is the first time that the current Pin received his own sent message relayed back to him therefore the Pin puts the message flags in the trace queue, remove the original sent message from the send queue, generate a short sound to alert the user and indicate the transmission on the screen 107. In the case that the message originator address doesn't match the current Pin address 105 the message is then a new message that is intended to be relayed to other Pins until it reaches its destination. Therefore the Pin puts the message's flags in the trace queue, and a copy of the message in the send queue 104 and assigns to it a priority order based on predefined rules.

Figure 12:
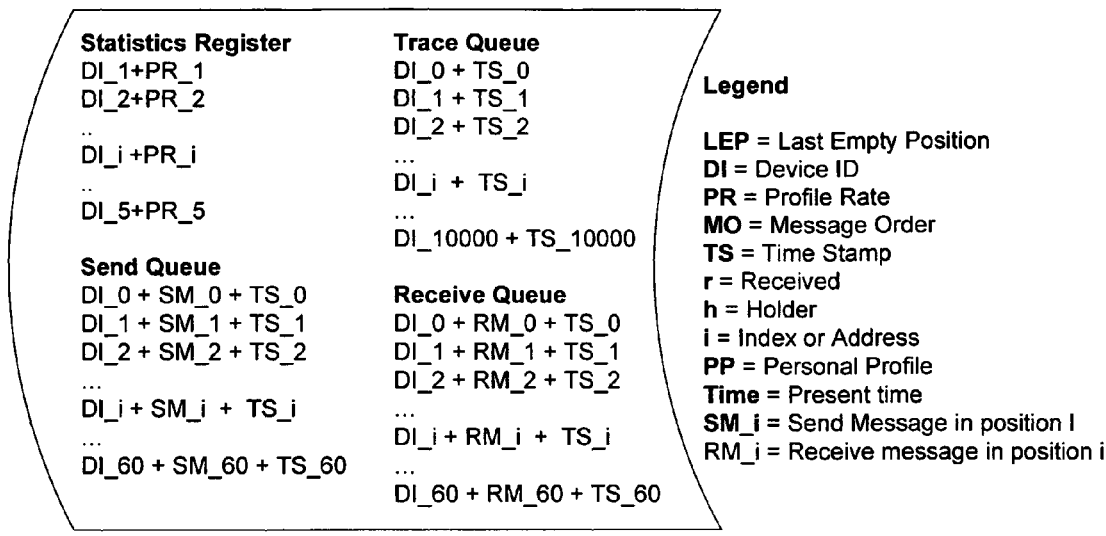
FIG. 12 shows the legend of the machine coding attributes and the register stacks.

FIG. 12 shows the mnemonics legend, the statistics table of the highest ranking of five received Pins' identifications, the send queue, the trace queue, and the received queue. The legend lists key variables: LEP is the last empty position is the queue, DI is the device identification formed of the originator address and the message order, PR is the profile rate used to rate the personality or likes matching, the MO is the message order indicates the sequential number of the message generated by the originator Pin, TS is the time stamp record the time of receiving or sending of the message, r is the index for received message, h is the index the address of the chosen position, I is the index the address, PP is the personal profile that represents the coded attributes of the personality or likes of the user, Time is the real time clock in the Pin, SM_I is the send message position order in the queue, RM_i is the receive message position in the queue. The trace queue doesn't contain the totality of the messages received instead it contains only the DI and the timestamp of all messages received. The send and receive queues contains the totality of the send and receive messages.

Figure 13:
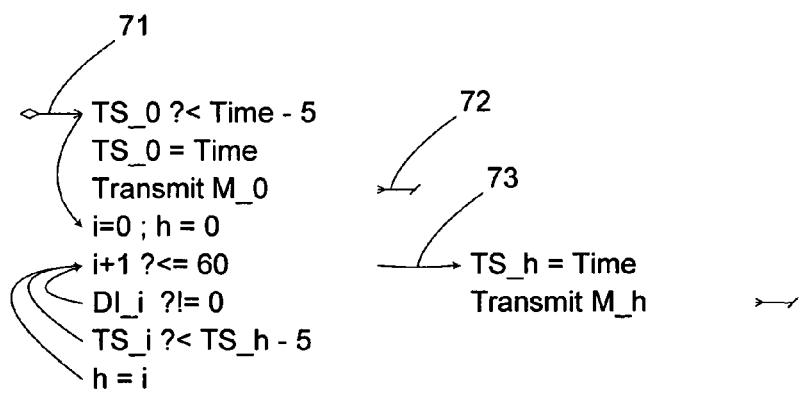
FIG. 13 shows a section of the code for the transmission machine code.

FIG. 13, with continued reference to FIG. 11, shows one routine used in the selection of the message to send in the block 93. This code works on the send queue and picks the first message in the send queue after revising block 91. But if the picked message has not yet waited in the queue for 5 seconds, then the code gets the longest waiting message and sends it instead. This method is crucial to ensure that messages don't stay forever in the send queue or clog it. The code conventions are as follows: the start point of the routing is indicated by the tag 71. If a compare operation is successful then the code goes to the following line code. If the compare operation fails, then the execution jumps with the indicated arrows such as at 73. The routines end when the end tag is reached such as at 72. This routine starts by comparing the first message timestamp to the actual time. If the message has been waiting in the queue for less than 5 seconds the execution jumps to a search loop. But if the message was waiting for more than 5 seconds, then the execution changes its timestamp to the actual time and transmits it. The search loop looks in all sixty messages for the messages intended for specific destinations (DI are not null which means they are valid messages and the position in the queue is not empty) and evaluate their timestamps, finds the oldest one, and retains its index in the holder indicator "h" to jump and transmit it at 73.

Figure 14:
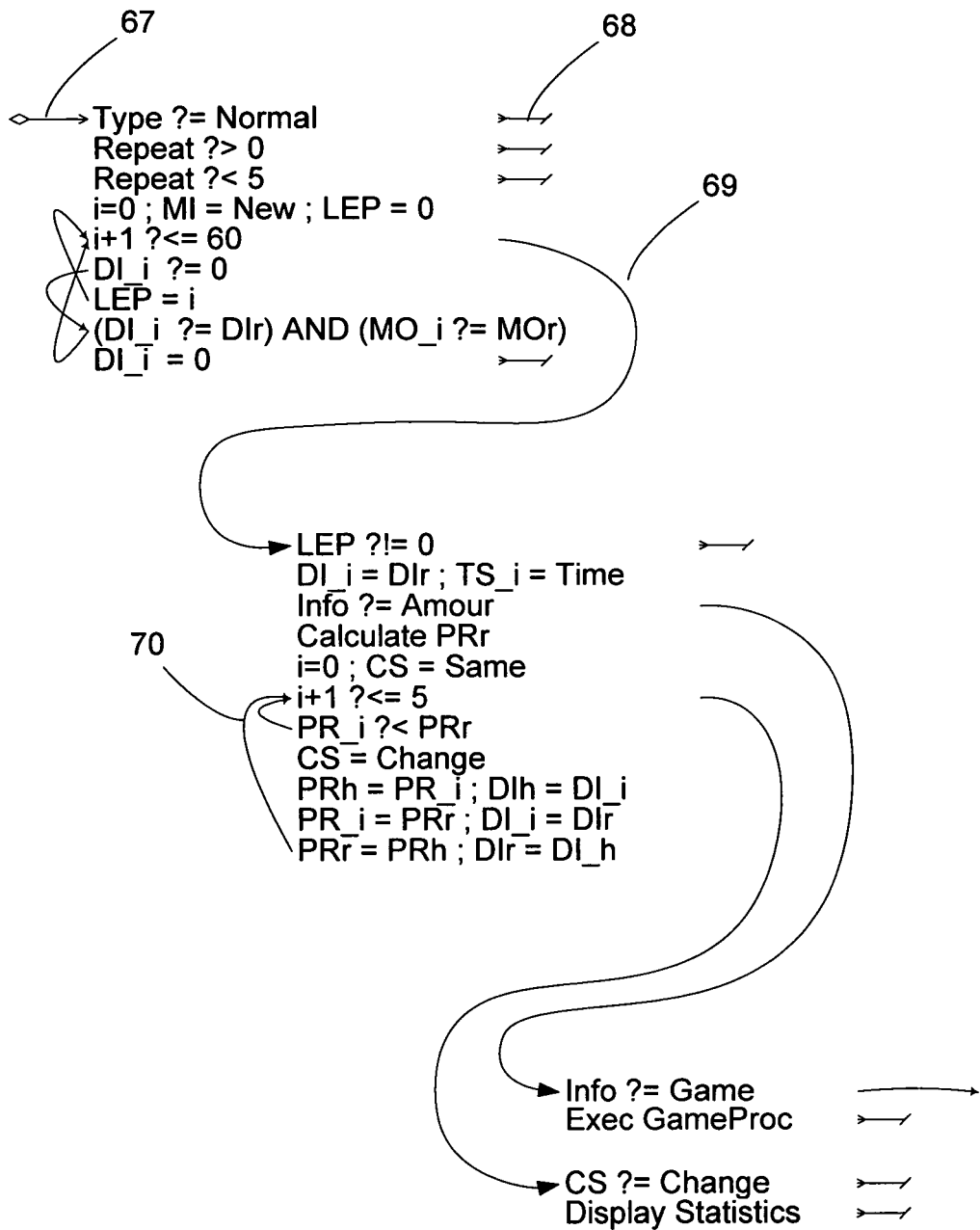
FIG. 14 shows a section of the code for the receiving machine code.

FIG. 14, with continued reference to FIGS. 11 and 13, shows a routine used to identify one specific type of message that is related to the like match and run rate calculation sequentially in blocks 100, 101 and 102. This code uses the same code convention used in FIG. 13. This code works on the trace and receive queue. It starts at 67 in the left side block with a detection that the message is a normal type message and has a regular repeat range and is not in the trace queue; this executes the lookup in trace queue 100. Because the message was not found 68 in the trace queue the execution jumps 69 to the middle block 70 where the info 101 is checked and if it is of like matching (labeled "Amour") the code calculates the profile rate and updates the statistics register. Pin display will alert the user of the change due to the new message if the rating actually changes. If the info is not Amour than execution jumps to the right block and verifies that it is not another like matching such as "Game" and continues so forth until confirming later that it is a voice or data message and executes 103.

FIG. 15 shows the block diagram composition of the Pin. Four Units condition and adjust the information presented by the user interfaces: LCD Unit 80 controls the LCD screen and additional features plugged in such memory, Sound Unit 79 controls the microphone and speakers, Switch Unit 78 controls the two pushbuttons, scroll and select, Serial Interface Unit 77 controls the USB communication port and assure the necessary electric current to charge the internal battery via the Charger Battery 76. The Transmitter Receiver block 75 is responsible for the wireless communication. The Control Unit 74 is based on an ultra low power microcontroller with embedded memory program and data space.

FIG. 16 shows radio waves coverage of three adjacent Pins A, B, C. A radio emission coverage 88 reaches B and C and this indicates that the A emitted signal can reach B and C directly and that, if B and C are working properly, they can receive A signal directly. B radio emission coverage 87 reaches A and C directly and this indicates that the B emitted signal can reach A and C directly and that, if A and C are working properly, they can receive the B signal directly. C radio emission coverage 90 reaches A and B directly and this indicates that the directly C emitted signal can reach A and B and that, if A and B are working properly, they can receive the A signal directly. This configuration creates a cluster 89 where the three Pins A, B, C can communicate directly among each other.

FIG. 17 shows radio waves coverage of three adjacent Pins A, B, C. A radio emission coverage 81 reaches B directly, but not C, and this indicates that the A emitted signal can reach B directly, but not C, and that, if B and C are working properly, B can receive the A signal directly while C cannot. C radio emission coverage 83 reaches B directly, but not A, and this indicates that the C emitted signal can reach B directly, but not C, and that, if B and A are working properly, B can receive the C signal directly while A cannot. B radio emission coverage 82 reaches A and C directly and this indicates that the B emitted signal can reach A and C directly and that, if A and C are working properly, they can receive the B signal directly. This configuration creates two clusters 84 and 88 and the only means to communicate between theses two is the Pin in the common area 85 that is B. Any message to cross from 84 to 86 or backward must by relayed by 85. Together FIG. 16 and FIG. 17 show static configurations where the Pins are fixed to locations. However, in real time, the Pins are moving and the clusters are in continuous movement such that new clusters are created while others diminish.

Figure 18:
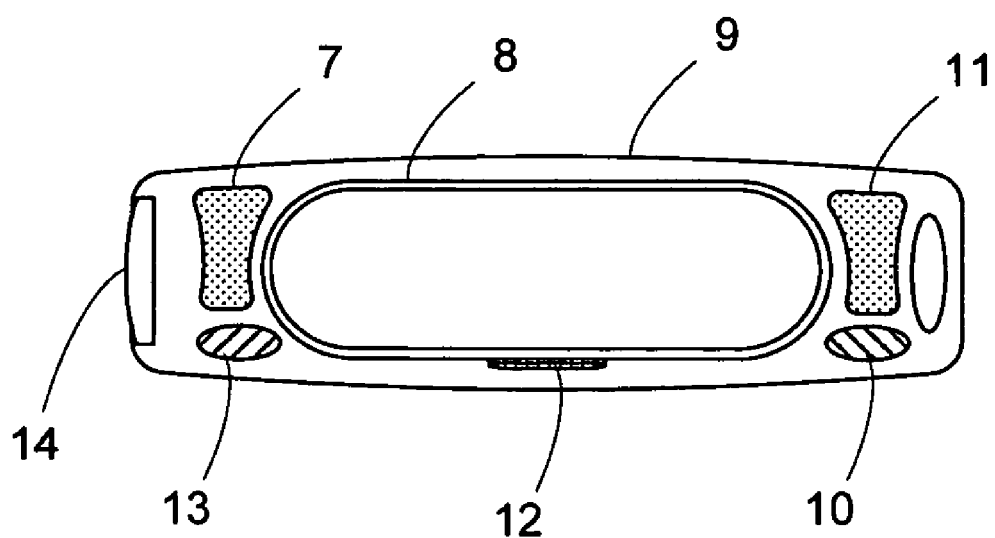
FIG. 18 shows the Pin enclosure and its external visible parts.

FIG. 18 shows the device body 9 that is equipped with multitude of user interfaces that facilitate its use and operation. It has an LCD screen 8 display message and data to the user, easily replaced with multitude of accessories by unclipping the LCD module by pressing and pulling on the small bracket 12. Accessories could be one or any combination of the following features: Color screen or other type of screen that replaces the basic LCD, additional flash memory, additional computation algorithms, additional programmed games and music. It has two push buttons: one is labeled Scroll 13 to scroll and set the focus on the line menus of the LCD screen 8, and the other is labeled Enter 10 to select the presented menu. It has a USB 14 connector to connect a computer. It communicates data back and forth between the PC and the device. It has sound speakers 7 and 11 with audio level programmable via the menus on the screen. It has a microphone controlled via the menus on the screen. The device can also be integrated in any $3^{rd}$ party systems and compartment that provide enough physical space to hold it.

FIG. 19 shows a list of the different standard and extended levels to which a user can extend the service via the W3 download feature in FIG. 4, including the service package for each level, the allocated message space for each service package and what the standard or extended service provides to the user.

Figure 20:
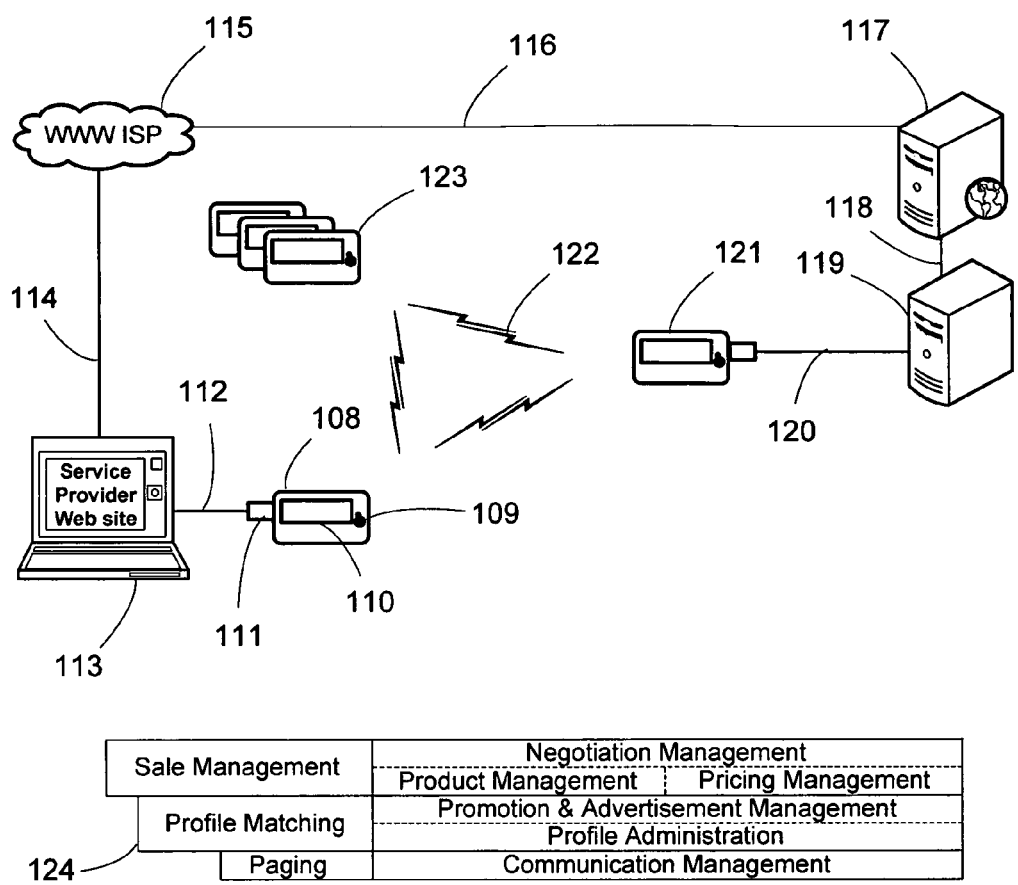
FIG. 20 shows the disclosed system physical communication structure that includes the user PIN, other users' PINs, a personal computer with a USB port to connect to the internet to reach the provider's web services, the provider's web services, the provider information system, and the provider's PIN.

FIG. 20 is a schematic showing a first-time user connecting at 111 his PIN 108 to his on-line 114 computer's 113 USB port 112, connecting to the internet 115 and browsing 116 to the provider's web site 117. Within a moment the user activates his account and edits his profile. The returning user connects his PIN to his computer to automatically and transparently download the latest updates from the service provider web site. The information exchanged between the user and the provider is secure and complies with privacy laws and regulations. Now the user has an activated PIN, he walks within a coverage area with other PIN users 123 or into the provider premises where the Provider Information System (PIS) 119 connected 120 to the provider's PIN 121 detects his presence over the wireless link 122, recognizes him, and greets him with a personalized message. The PIN receives the message and alerts the user with a tiny beep sound and/or a flash of the screen 110. The users can acknowledge or reply by selecting a message with a joystick 109 from a predefined set of messages programmed in advance either by the user or offered by the paging message itself.

The PIS system runs the PIN Management Application Stack 124 that is built going upward from the Communication Management module, Profile Administration, Promotion & Advertisement Management, Product Management and Pricing Management, to the top level of Negotiation Management Module. This stack delivers three levels of functionality: basic for paging, advanced for profile match rating, and complete for the sales management. Note that the Product Management and Pricing Management are two modules that could be standalone or connected to the retailer product management system when available. These two modules are responsible for providing the products and services information data to the PIS to process and propose the sale to the user.

In the paging application, the service provider uses the communication management module of the paging application stack to transmit short messages to predefined users. This application resembles the paging service provided by the wireless operators with main differences: the system doesn't require an infrastructure to transmit and receive and the service is limited to the user in-network that is within the coverage area.

Figure 21:
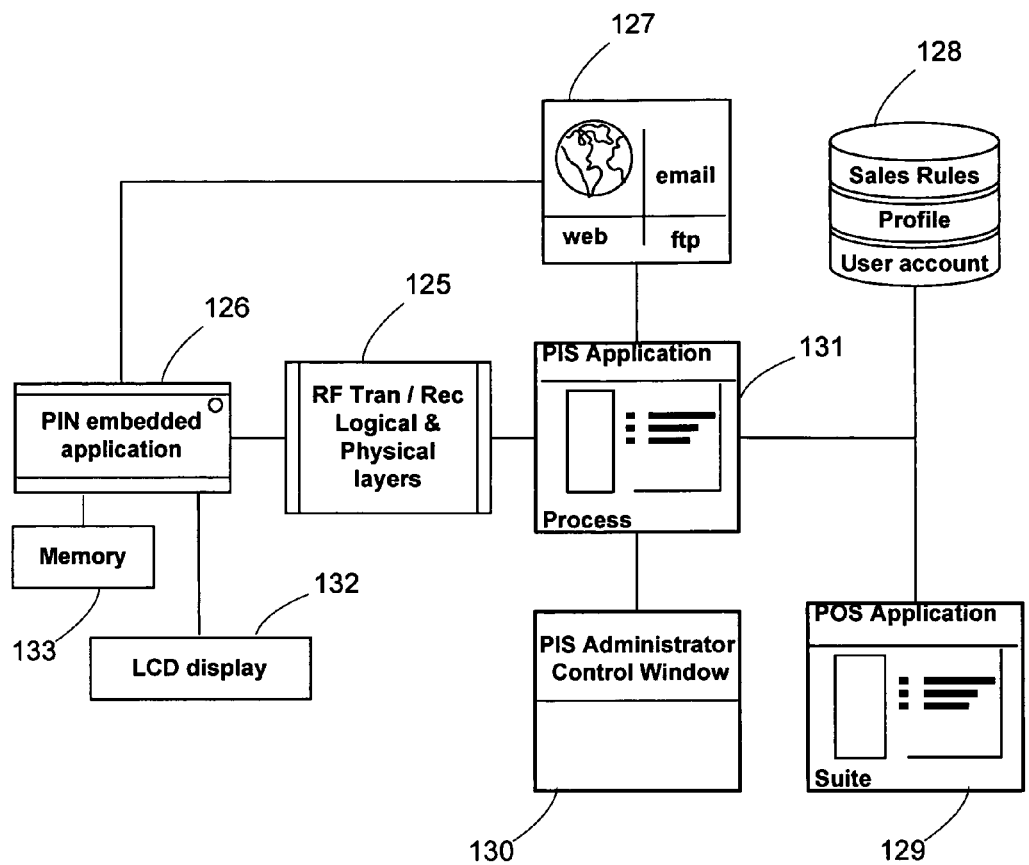
FIG. 21 shows the applications communication structure.
Figure 22:
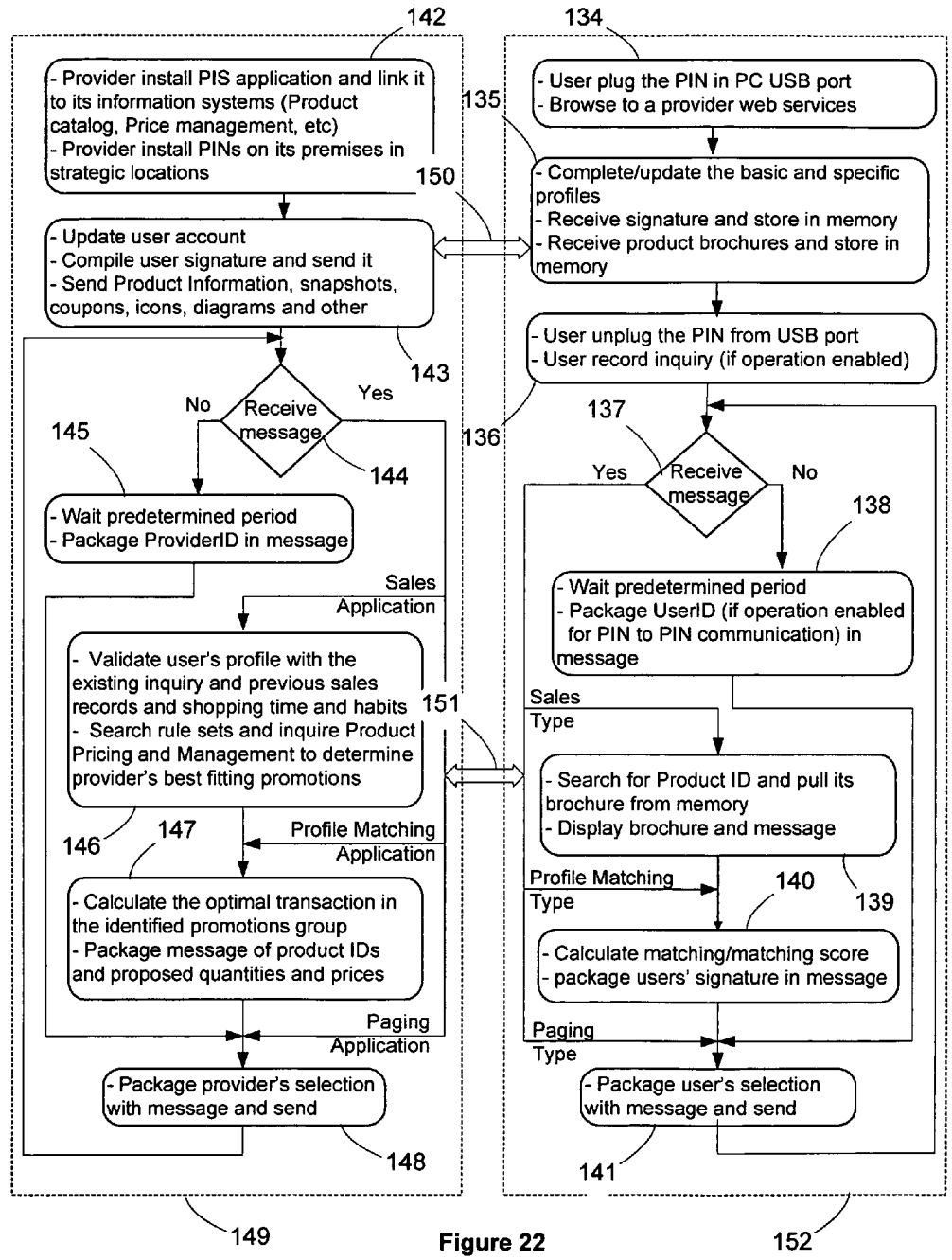
FIG. 22 shows the applications processes structure.

FIG. 21, with reference to FIG. 22 shows the PIS Application 131 creating a generic account for each PIN added to the PIS users' group in the User Account database 128. From the PIS Administrator Control Window 130 the administrator is capable of editing the basic information associated with each account. The users can access the service provider's web site and review their account and connect their PIN via the USB port and complete the optional information package such as customized reply messages, user's name alias that will be presented to the other PIN users, and other data fields that the administrator enabled. This operation completes setting the user's basic profile.

This application is suited for restaurants, enterprises, schools, general public, and many other similar situations. In the restaurant example, the user gets into the restaurant to register for a table. The PIS sends an invitation via the RF Transceiver 125 for registration to the user's PIN gets the users automatically registered in the system. The users will get notification to his PIN soon as his table is ready.

In the enterprises example, the employees use their PIN instead of their security cards. It can be managed by the user or the security administrator. The users are paged at anytime within the premises of the offices with no recurrent costs. The users can acknowledge or reply by selecting a message with a joystick 109 from a predefined set of messages programmed in advance either by the user or offered by the paging message itself. In the school example, the academic staff uses the PIN in similar fashion as the enterprises example. The student uses the paging functionality to replace the cell phone text messaging service. They can receive broadcasts from the staff and reply very easy. School can monitor presence and location of student all time assuring security of campus. The advantage of PIN is that it free of service charges but with the limitation of being restricted within the coverage area. In the general public example, it could be used by users in stadiums, conventions, parties, neighborhoods and many other places to broadcast many messages, such lost items, door prizes ticket numbers, time table and reminders for speakers and sessions room locations, promotional items and so forth.

At the profile match rating application level, the first time user of a service provider connects his PIN to his computer and browses to the provider's web site 127 to complete an advanced profile in the Profile Database. Each service provider has a different specific profile to complete depending on the service provided in addition to the basic profile. The web service compiles the user's profile data into a compact signature-like packet and sends it to reside on the user's PIN memory module 133. This packet is a compact encrypted form of the user's profile data element and will reside in the user's PIN to be shared with other systems (PINs or PISs) when allowed. Some part of the signature exchange is safeguard by the authorization and security interlocks of the authentication protocol mechanisms.

In addition this application is suited for personality match rating, malls, attraction parks, car dealers, and many other similar situations. The user can be a user of as many services concurrently as he wants with the only limitation being the physical electronic memory in the PIN device.

For personality match rating, the user's PIN embeds a signature of his specific likes in another person and presets the rule of exchange with other PINs/PISs. The collected signatures are processed in the order they are received and a rating is displayed to the user on the LCD display module 132. The highest rating signature can be selected for predefined replies. The service is limited to the user in-network that is within physical distance reach. It introduces the user to the people in proximity that to his surprise might have the same likes and tastes. This service will positively affect the social relations of people in proximities because it facilitates exploring each other's likes to reveal, if the user chooses to, the points in common and the points of differences and provides the opportunity to bring people together. There will be no more "blind date" because the PIN will reveal immediately the match degree, if the user chooses to, and enables the exchange in the PIN.

In a mall environment, the user's PIN embeds a signature of his specific likes in products and taste in foods. When the user is within connection distance with the mall's PIS, the PIS receives the user's signature and replies with the closest match of different products, stores, and food court menus. The user might choose to investigate further the offers and may reply with further inquires on specific items. The user receives instantly the best promotion for things of his taste and retailers are in better position to reach individuals that are most likely to buy their products. The mall administration could be the administrator of one PIS and each retailer could have his own PIS.

For theme parks and similar attractions and entertainments, the user's PIN embeds a signature of his specific likes of rides, activities, and taste in foods. When the users is within connection distance with the park's PIS, the PIS receives the user's signature and replies with the closest match of different activities and their actual waiting times, along with menus at the food stands. The user might choose to investigate the offers further and may reply with further inquires on specific items. The users are able to receive instantly the best promotions for specific rides/activities and items of his taste and park managers are in a better position to reach individuals that are most likely to buy their products.

For a car dealer, the scenario is similar to the previous two with the difference in the specific profile data. The user gets an immediate indication of which car on the lot is best based on his profile and likes, including of course his budget. Dealers will have a better means by which to understand the user's selection criteria and to turn the experience of visiting the car dealer into a very enjoyable one. The car dealer could have one PIS that manages all of the lot's cars' profiles or, alternatively, could opt to assign one PIN to each car. In this latter case the profile match rating will be between PINs.

At the sales management application level of functionality, the user already has an active PIN, an active profile completed at the provider's web service (WS) and a residing signature in his PIN. In addition to the signature the web service uploads to the PIN's memory 135 a predefined set of data that contains specifics about products, prices, promotions, coupons, and much other information. This package of information is updated each time the PIN is connected to the provider web services. The user can elect to have automated updates and will transparently update the data when the PIN is plugged in the USB port of an online PC. Having this relatively large amount of data stored on the PIN will reduce the size of the message while the PIN is negotiating with the PIS on provider's premises and render the exchange fast and efficient.

When the PIN is offline (PIN disconnected from the web service) the user has the option to select a combination of predefined rules to calculate multiple match rating schemes in his PIN 140. Also offline the user has the option to select from the provider's product IDs stored in his PIN a combination of interests that he intent to check on his next visit to the provider premises. This combination is called inquiry 136 for the remaining of this document.

The PIS at this application level has a Sales Rules database 128 where the discounts formulas reside for different conditions, products, and situations. Also the PIS have the interfaces modules Product Management and Pricing Management 124 with the point of sales infrastructure applications 129 to query the products/services that should be promoted and the pricing ranges. The applications module Negotiation Management 124 handles the interaction back and forth between the PIS and the user.

FIG. 22, with continued reference to FIG. 21, shows the PIN 152 and the PIS 149 applications process structures. The web link communication 150 and the wireless link 151 are shown. When the PIN comes into the coverage of the PIS, this later detects its presence and sends him a welcome message. The PIS having on file the user's profile and his previous service record and selections/pre-selections 146 uses predefined and programmed sales rules 128 to formulate 147 the first offer and sends it 148 to the user's PIN.

The user receives the product IDs and pulls from memory the full data information about the product/service 139 then interact with the PIS 141 while deciding on the items that he is picking and the PIS is continuously formulating and optimizing the sale operation until it announces to the user his overall "potential" savings if he commits to the sales as negotiated. The PIN algorithms run through its inquiry list and determine if the proposed operation is satisfactory and displays the rating to the user 140.

Coming to the checkout counter the user has completed checking his cart's items and ready for payment operation. The PIS recognizes the completed commitment then issues the agreed discount. The sale is complete. The user received a personalized service and best price for the items that he wanted. The provider promoted additional products and made optimum sale. Knowing when the user is in the store with his profile and buying habits, the provider is making more selling and profit by knowing what and when to promote.

Although preferred embodiments have been depicted and described in detail herein, it will be apparent to those skilled in the relevant art that various modifications, additions, substitutions and the like can be made without departing from the spirit of the invention, and these are therefore considered to be within the scope of the invention as further illustrated by the claims which follow.

What is claimed is:

1. A portable, hand-held electronic device for wireless communication, comprising:
   an addressable point in network (Pin) having an originator address, said Pin configured to relay wireless signals containing one or more destination addresses for each message to one or more other Pin devices;
   a relaying mechanism with a radio frequency transmitter and receiver;
   a memory having a trace queue configured to contain identifying flags for only an originator address, message order and timestamp of all messages received, a send queue configured to contain Pin transmittable messages having an assigned priority of transmission and a receive queue configured to contain received messages for the Pin, wherein contents of the queues are reorderable and removable;
   a display screen configured to display a message with a sound alert; and
   a connector to a computer communication port in a computer having a memory, a processor and at least one network connection.

2. The portable, hand-held electronic device of claim 1, wherein the computer communication port is a USB port in a computer having a memory, a processor and at least one network connection.

3. The portable, hand-held electronic device of claim 2, wherein in a first instance of use, the device acquires its configuration attributes, ID and password over the at least one network connection.

4. The portable, hand-held electronic device of claim 1, wherein each Pin is configured to listen, to create and to transmit the wireless signals sporadically with or without a predetermined pattern.

5. The portable, hand-held electronic device of claim 1, wherein each Pin is configured to listen for all available wireless signals when not transmitting.

6. The portable, hand-held electronic device of claim 1, wherein each Pin is configured to further transmit a wireless signal received or transmitted by the Pin when the received or transmitted signal is not followed by a matching signal within a limited time period.

7. The portable, hand-held electronic device of claim 1, wherein each Pin is configured to keep and to not retransmit the message or other content contained in a received wireless signal if the signal comprises information that the receiving Pin is an intended destination.

8. A system for wireless communication, comprising:
   one or more of the hand-hand therefor electronic devices of claim 1, each of said devices comprising an addressable point in network;
   an enterprise provider information system (PIS) comprising an application stack configured to wirelessly transmit messages comprising product and services information or other content to one or more points in network (Pin(s)) upon detecting the Pin(s) address within a field covered by the PIS and to receive messages from Pin(s); and
   a wireless network over which the information is transmitted to and received from the Pin(s).

9. The wireless communication system of claim 8, further comprising:
   a computer having a memory, a processor, one or more USB ports and at least one network connection; and
   one or more web services accessible to the device(s) over a computer network connected to the device.

10. The wireless communication system of claim 8, wherein the PIS application stack comprises paging services, said application stack enabling transmission of data messages containing a page for one or more specific users' Pin addresses.

11. The wireless communication system of claim 8, wherein the PIS application stack comprises universal profile match rating services, said application stack enabling transmission of data messages containing a user's profile comprising personal attributes, specific merchandise likes and dislikes to one or more other specific profile matched users' Pin addresses.

12. The wireless communication system of claim 8, wherein the PIS application stack comprises sales management, said application stack enabling transmission of data messages containing sales offers or bids, product or service information, general information packets provided by the enterprise PIS to specific users' Pin addresses or as a general broadcast to all Pins within the field covered by the PIS.

13. The wireless communication system of claim 8, wherein the PIS application stacks are configured for use in schools, universities, colleges, stadiums, business or retail premises, hospitals, within a city block, or similar areas.

14. A method for wireless communication, comprising:
   transmitting one or more wireless signals containing messages comprising one or more of product or services information or other content to one or more receiving points in network (Pin(s)) over the wireless communication system of claim 8.

15. The method of claim 14, further comprising:
   relaying the transmitted wireless signals from the receiving Pin(s) to one or more Pins within a field of coverage of the receiving Pin(s) or to one or more Pins in one or more fields of coverage overlapping the field of coverage of the receiving Pin(s) over the wireless network comprising the wireless communication system.

16. The method of claim 15, wherein the relaying comprises listening for all wireless signals over the wireless network available to the Pin(s) within its field of coverage when the Pin(s) is not relaying the transmitted wireless signals.

17. The method of claim 16, wherein the Pin(s) receives a wireless signal with a destination address matching the receiving Pin(s) address, the method comprising:
   comparing message flags in a transmitted message comprising the received wireless signal with message flags previously received and stored in the trace queue comprising the device memory in the communication system to determine if the message is new or previously received.

18. The method of claim 17, wherein if the message flags match, a received message is a previously received message, the method comprising:
   discarding the received message; and
   prioritizing remaining queued messages.

19. The method of claim 17, wherein if the message flags do not match, a received message is a new message, the method comprising:
   storing the received message in the trace and received messages queues; or
   activating one or more other functions comprising the device(s).

20. The method of claim 16, wherein the Pin(s) receives a wireless signal with a destination address that does not match the receiving Pin(s) address, the method comprising:

comparing an originating Pin(s) address with a receiving Pin(s) address to determine an origin of the received signal.

21. The method of claim 20, wherein the originating address matches the receiving Pin(s) address, the method comprising:

updating the memory queues if a received message flags match the message flags comprising the trace queue; wherein the received message was relayed back to the receiving Pin(s) previously; or adding the received message flags to the trace queue and removing an original sent message from the send queue, if no match is found; wherein the received message is a first relay back to the receiving Pin(s).

22. The method of claim 20, wherein the originating address does not match the receiving Pin(s) address, the method comprising:

adding a received message flags to the trace queue; and adding a copy of the message to the send queue with an assigned priority of transmission.

23. The method of claim 22, further comprising:

transmitting the wireless signal carrying the received message to one or more other Pins if no matching second signal follows a first received wireless signal within a random limited period of time.

24. The method of claim 14, further comprising relaying a message to the PIS in response to the PIS transmission.

25. The method of claim 14, wherein the wireless signal is relayed from a PIS when the Pin(s)' address is detected within the PIS field of coverage.

26. The method of claim 14, wherein the wireless signal is relayed as a general broadcast to all Pin(s) detected within a Pin(s) or PIS field of coverage or relayed to specific Pin addresses.

27. The method of claim 14, wherein a message is voice messages, data, games, music, personalized promotional advertisements, personality matched attributes, universal likes matched attributes, services offers, sales offers or bids, or general information packets.

* * * * *